United States Patent [19]

Bredow

[11] Patent Number: 4,507,995

[45] Date of Patent: Apr. 2, 1985

[54] ARRANGEMENT FOR REMOVING WORKPIECES FROM A CUTTING PRESS

[75] Inventor: Walter Bredow, Alfeld, Fed. Rep. of Germany

[73] Assignee: C. Behrens AG, Alfeld, Fed. Rep. of Germany

[21] Appl. No.: 315,208

[22] Filed: Oct. 26, 1981

[30] Foreign Application Priority Data

Nov. 13, 1980 [DE] Fed. Rep. of Germany ....... 3042717

[51] Int. Cl.$^3$ .............................................. B26D 7/18
[52] U.S. Cl. ....................................... 83/153; 83/112; 83/157; 83/412
[58] Field of Search ..................... 83/151–153, 83/112, 160, 158, 159, 130, 131, 132, 133, 134, 135, 136, 137, 138, 139, 140, 410, 412, 414, 415, 518, 519, 552, 549, 565, 437; 74/344, 427; 414/15, 17, 18, 19, 749, 750; 198/487, 740

[56] References Cited

U.S. PATENT DOCUMENTS

| 2,854,733 | 10/1958 | Smith .................... 83/160 |
| 3,126,816 | 3/1964 | Thompson ............... 83/157 |
| 3,469,887 | 9/1969 | Nakahara et al. ........ 414/676 |
| 3,874,262 | 4/1975 | Cailloux ................. 83/565 |
| 4,250,784 | 2/1981 | Bredow .................. 83/518 |

FOREIGN PATENT DOCUMENTS 264619 1/1950 Switzerland ................... 83/135

Primary Examiner—Frank T. Yost
Assistant Examiner—Hien H. Phan
Attorney, Agent, or Firm—Michael J. Striker

[57] ABSTRACT

A cutting press equipped for handling and treating or working plate-shaped workpieces or articles, especially of sheet metal, includes at least one cutting tool which is driven from a main drive of the machine through transmission components and its own driving arrangement. An additional severing arrangement is mounted on the same machine frame and is equipped with its own driving arrangement, the transmission members being selectively coupleable with the cutting tool and with the severing arrangement. The machine further includes a coordinate table for advancing the respective workpiece. An entraining arrangement is provided at the part of the machine frame which is associated with the severing arrangement and at the region of the workpiece which is free from the severing tools. The entraining arrangement is arranged above a support surface for the workpiece which extends in the same plane as the support surface of the coordinate table and is lowerable toward the workpiece. The entraining arrangement is operative for transporting the respective workpiece from the severing arrangement to a following conveying arrangement.

8 Claims, 5 Drawing Figures

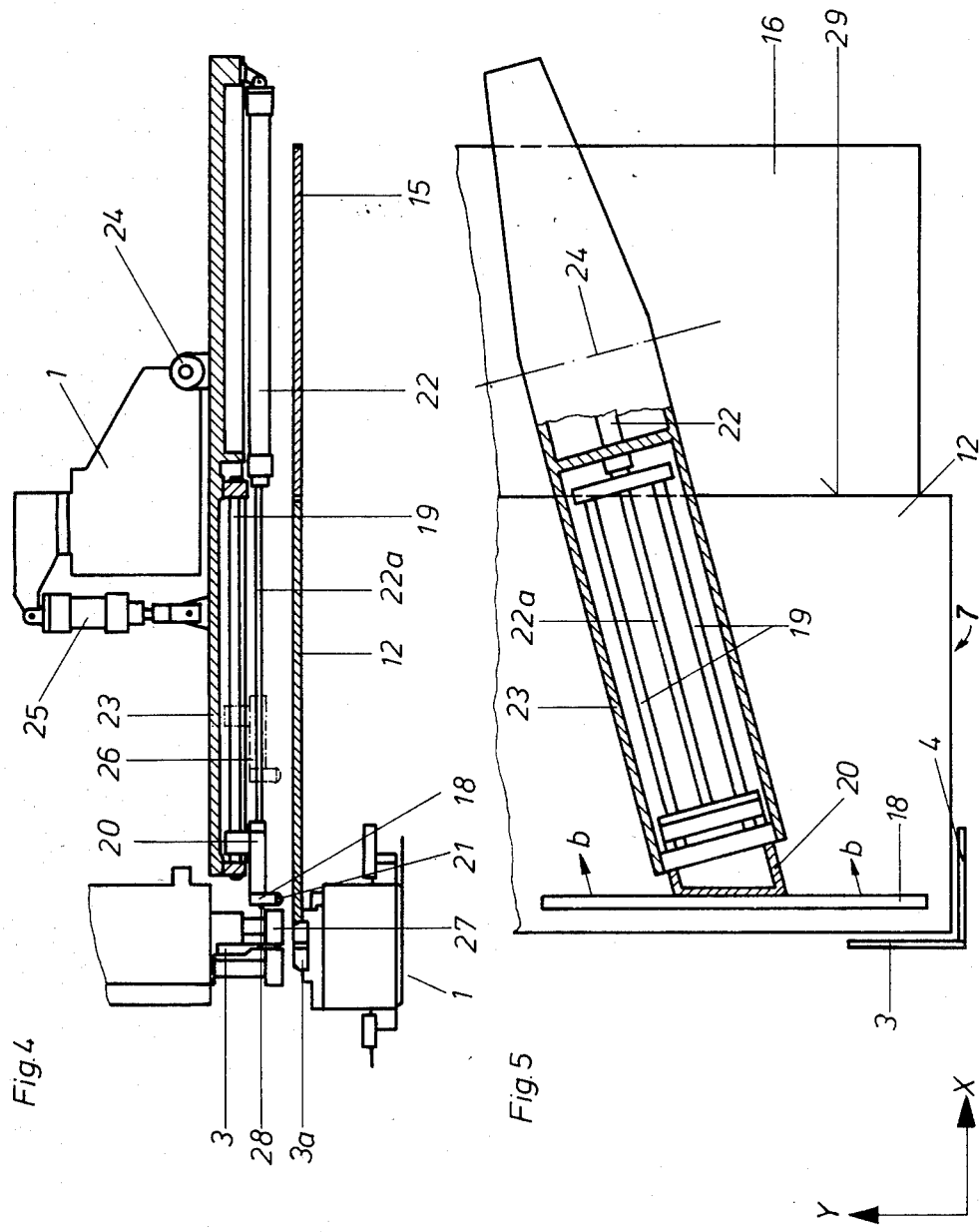

ARRANGEMENT FOR REMOVING WORKPIECES FROM A CUTTING PRESS

BACKGROUND OF THE INVENTION

The present invention relates to arrangements for transporting workpieces in general, and more particularly to an arrangement for removing workpieces from a cutting press.

There are already known various constructions of pressing machines, among them that which is disclosed in the U.S. Pat. No. 4,250,784 and which will hereafter be referred to as a cutting press. This cutting press is arranged and equipped for machining plate-shaped workpieces, such as cutting, severing or otherwise working the same. This cutting press includes a main drive which drives at least one cutting tool by means of a transmission, and an additional severing arrangement is mounted on the same machine frame or body, being equipped with its own transmission, the transmissions of the cutting tool, on the one hand, and of the severing device, on the other hand, being selectively couplable to the main drive.

A cutting press of this construction can be considered to constitute a working or machining center in which plate-shaped and especially sheet metal workpieces are first treated by the cutting tool whereupon, in an immediate succession and in the very same machine, the additionally needed severing operations can be performed on the workpiece with the highest possible accuracy, while the respective workpiece clamping is maintained throughout this procedure. When such a cutting press is equipped with and/or cooperates with a numerically controlled or NC coordinate table, there is obtained a very highly automated working or machining of the workpiece in this working or machining center.

The present invention is concerned with a cutting press of this type and strives to improve the same.

SUMMARY OF THE INVENTION

Accordingly, it is an object of the present invention to improve the cutting press of the type discussed above.

More particularly, it is an object of the present invention to so construct or equip the cutting press of this type as to be able to remove the workpieces from the region of the severing means after the completion of the severing operation in an automatic manner.

An additional object of the present invention is to increase the degree of automation of the cutting press and thus of the above-mentioned working or machining center relative to the current state of the art.

It is a concomitant object of the invention to provide an arrangement for removing the finished workpieces from the cutting press, which is simple in construction, inexpensive to manufacture, fits into the space available in the cutting press, and is reliable in operation nevertheless.

In pursuance of these objects and others which will become apparent hereafter, one feature of the present invention resides in an arrangement for removing plate-shaped workpieces from a cutting press including a frame, a support table mounted on the frame and having a support surface for the workpieces extending along a plane, a coordinate table extending along this plane and operative for advancing the workpieces along the support surface toward machining and severing zones of the support table, and machining and severing devices respectively arranged at the machining and severing zones, the removing arrangement comprising, briefly stated, means for entraining the respective workpiece at the severing zone outside of the operating range of the severing device and for transporting the entrained workpiece in a predetermined direction away from the severing zone, the entraining means being mounted on the machine frame upwardly of the support surface of the support table for movement toward and away from the aforementioned plane between a rest position and an entraining position in which it transports the respective workpiece in the predetermined direction; and conveyor means arranged along the path of transportation of the workpieces downstream of the entraining means and operative for removing the workpieces out of the range of operation of the entraining means.

When the cutting press of the aforementioned type is equipped with the removing arrangment of the just-discussed construction, there is obtained the advantage that the respective finished workpiece which is then situated at the severing zone can be removed from such severing zone by means which is dedicated to the cutting press, that is, by the entraining means, to be subsequently removed from the vicinity of the cutting press altogether by the conveyor means. All this is accomplished without any need for additional manual labor at the cutting press during its operation. In this manner, it is possible to achieve the removal and transportation of the workpieces out of the operating range of the cutting press in an automated manner, so that the working or machining center which is constituted by the cutting press can operate, for all intents and purposes, in a fully automatic manner. Feeding or supplying devices, which are capable of removing plate-shaped or sheet-shaped workpieces or blanks from a stack or the like and of supplying the same in a fully automatic manner to the coordinate table of the cutting press, as well as so positioning and orienting such plate-shaped or sheet-shaped workpieces or blanks on the coordinate table that they can be securely clamped to the latter by the associated clamping devices, are already known. Thus, by resorting to the use of the removing arrangement of the present invention, one succeeds in creating a fully automatically operating working or machining center. The lowerable entraining means arranged in accordance with the present invention can be mounted on the machine body or frame at the region thereof which is left free by the severing tools, in a very advantageous manner, and it is possible to operate the removing arrangement in a manner which takes into consideration the properties of the respective workpiece and the available space by appropriately arranging the removing arrangement and the driving means therefor, and by operating the same in dependence on the operation of the cutting press itself, from a common control unit, for instance.

For a reliable removal of even such workpieces which have relatively large transverse dimensions and/or thickness, it is advantageous when, in accordance with one aspect of the present invention, the entraining means includes a flat carrier extending along the aforementioned plane at a predetermined distance therefrom at least in its entraining position, the carrier having a lower portion, a plurality of entraining rollers being mounted on the lower portion of the carrier for rotation about parallel axes extending normal to the predetermined direction, there being further provided means for rotating the entraining rollers about their respective axes.

When the severing operation at the severing zone is completed, the carrier is lowered by means of suitable driving means, especially by means of a pneumatic or hydraulic cylinder-and-piston unit, or by a motorically driven spindle transmission, until the entraining rollers establish a frictional contact with the upper surface of the respective workpiece. Inasmuch as these entraining rollers are driven in rotation, the respective workpiece is reliably transported by the entraining rollers to the desired side of the machine and can then be transferred to the associated conveying means. The driving movements of the carrier and of the entraining rollers can be controlled within the overall driving arrangement of the cutting press by suitable means in an automatic manner, in order to thus obtain a fully automatic operating sequence. Advantageously, the entraining rollers are provided with a high-friction or friction-enhancing coating or layer in order to increase the entraining effect, such layer including, for instance, a jacket of a synthetic plastic material, rubber, or a similar material which increases the friction. This frictional jacket may be smooth at its outer circumferential surface, but in order to even more improve the entraining effect, it may be provided with a surface structure or texture which enhances the friction between the jacket and the workpiece to be entrained, such as corrugations, flutes and the like. Should only workpieces of a magnetic or magnetically attractable material be treated on the particular cutting press, the entraining rollers could also be constructed as magnetized rollers.

In order to keep the friction on the associated support table as low as possible, on the other hand, it is further advantageous when, in accordance with another aspect of the present invention, the support table is provided with a plurality of rolling bodies, such as rollers or balls, which are distributed over the support surface and support the respective workpiece from below. The entraining action can further be enhanced when, in accordance with another facet of the invention, the support table is provided with a plurality of air nozzles which are distributed over the support surface and which direct respective streams of air against the bottom surface of the respective workpiece. Thus, it can be achieved during the entraining operation that the workpiece floats on an air film or cushion which presses the workpiece against the entraining rollers.

A further construction which is advantageous both as to its structure and its operation is obtained when, in accordance with the present invention, the carrier is secured to the driving member or part of a vertically effective driving arrangement, which is arranged on the machine body or frame upwardly of the movement region or of the support table. The above-mentioned driving arrangements are suited for this purpose. The arrangement of the driving arrangement and of the carrier is especially simple and structurally advantageous under these circumstances.

For a number of applications, especially when the workpieces are relatively thin and/or light, it may be advisable to use a different construction of the entraining means according to the present invention, this modified entraining means including a rocking member mounted on the frame for pivoting about an axis normal to the predetermined direction; means for pivoting the rocking member about its axis; an adjusting member mounted on the rocking member for movement in and opposite to the predetermined direction; means for moving the adjusting member relative to the rocking member, this moving means being mounted on the rocking member; and an elongated entraining member mounted on the adjusting member for movement therewith and extending above the zone of the support surface which supports the respective workpiece after the termination of the severing operation. The entraining member, which is advantageously constructed as a rail or a bar, constitutes a so-called wiper for the respective workpiece. After the termination of the machining operation at the severing device, the entraining member which is in its extended position at this time, is lowered toward the upper surface of the respective workpiece by a simple pivoting or rocking movement of the rocking member, whereafter the entraining member is retracted in the intended direction of advancement of the workpiece due to the retraction of the adjusting member, until the workpiece leaves the support surface and is transferred to the following conveying arrangement. Because of the pivotable mounting of the rocking member and the construction and operation of its driving means, a uniform and secure pressure can be exerted on the workpiece for the entire duration of its displacement over the support table. The rocking member which is being used in accordance with the present invention can easily be mounted or supported on the machine frame, together with its driving arrangement. Even here, the driving arrangement for the rocking member may include or be constituted by a pneumatically or hydraulically operated cylinder-and-piston unit; however, other suitable driving arrangements can be used instead.

A structurally particularly advantageous construction is obtained when the rocking member is provided with at least two guide rods extending in the predetermined direction, and when the adjusting member is mounted on the guide rods for movement longitudinally thereof. In order to enhance the entraining effect, the entraining member, that is, the entraining rail or bar, can advantageously be provided with ribs or pin-shaped projections of a material which increases friction, such as of a synthetic plastic material or rubber.

For the conveyance of the workpiece out of the range of operation of the entraining means, which follows the transportation of the workpiece in the predetermined direction by the entraining means, it is advantageous with a view to the automation of the operation of the cutting press when, in accordance with a further concept of the present invention, the conveying means includes a descent surface for the respective workpiece, this descent surface extending in the predetermined direction from the support surface, and being inclined in the downward direction as considered in such direction. Advantageously, the angle of inclination of the descent surface is adjustable. In this manner, there is provided a descent slide for the workpiece which has been transported beyond that edge of the support table at which the descent surface is arranged, this slide conveying such a workpiece to that region of the machine at which there are arranged stacking or collecting devices for the workpieces.

During the operation of the cutting press or of the machining or working center obtained in the above-mentioned manner, it can happen that the width of the workpieces to be transported exceeds that dimension which can still be safely handled by the descent surface or slide. In order to assure a safe removal of the workpieces even under these circumstances, there may be provided, in accordance with an additional feature of the present invention, withdrawing means equipped with gripping means for a portion of the workpiece at the side of the workpiece support surface which extends in the predetermined direction. It is possible to engage the excessively wide workpieces by such withdrawing means, to remove the same from the press region, and to subsequently stack the same, for instance, on a liftable table. Advantageously, a pneumatically or hydraulically operated driving arrangement is provided even for the withdrawing means or arrangement.

In the aforementioned U.S. Pat. No. 4,250,784, there is disclosed a cutting press in which the severing device includes two severing blade tools having cutting edges which extend normal to one another in the displacement directions of the coordinate table, and which are movable in such directions. In accordance with a further facet of the present invention, it is advantageous when the movement region for the arrangement of the entraining means thereat is situated at those sides of the severing blade tools which face in the predetermined direction. In this manner, there is obtained the removal or transportation of the workpieces in accordance with the invention, without impairment of or interference with the movement of the severing blade tools. Thus, the support table and the entraining means border with the angle which is enclosed between the severing blade tools and extend therefrom to the open side of the cutting press or of the machine frame. In such a construction, it may be advantageous when the direction of movement of the entraining member and of the adjusting member thereof in the second above-discussed embodiment of the removing means of the present invention extends at an acute angle smaller than the right angle with respect to the directions of displacement of the coordinate table. In this manner, there is obtained a secure and unimpeded removal of the respective workpiece toward the desired side of the cutting press.

The novel features which are considered as characteristic of the invention are set forth in particular in the appended claims. The improved cutting press equipped with the removing arrangement of the present invention, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2a is a sectional view of a fraction of the arrangement as depicted in FIG. 2;

FIG. 4 is a diagrammatic view corresponding to that of FIG. 2 but of a modified removing and entraining arrangement of the present invention; and FIG. 5 is a top plan view of the arrangement depicted in FIG. 4.

DETAILED DESCRIPTION OF THE PREFERRED EMBODIMENT

Figure 1:
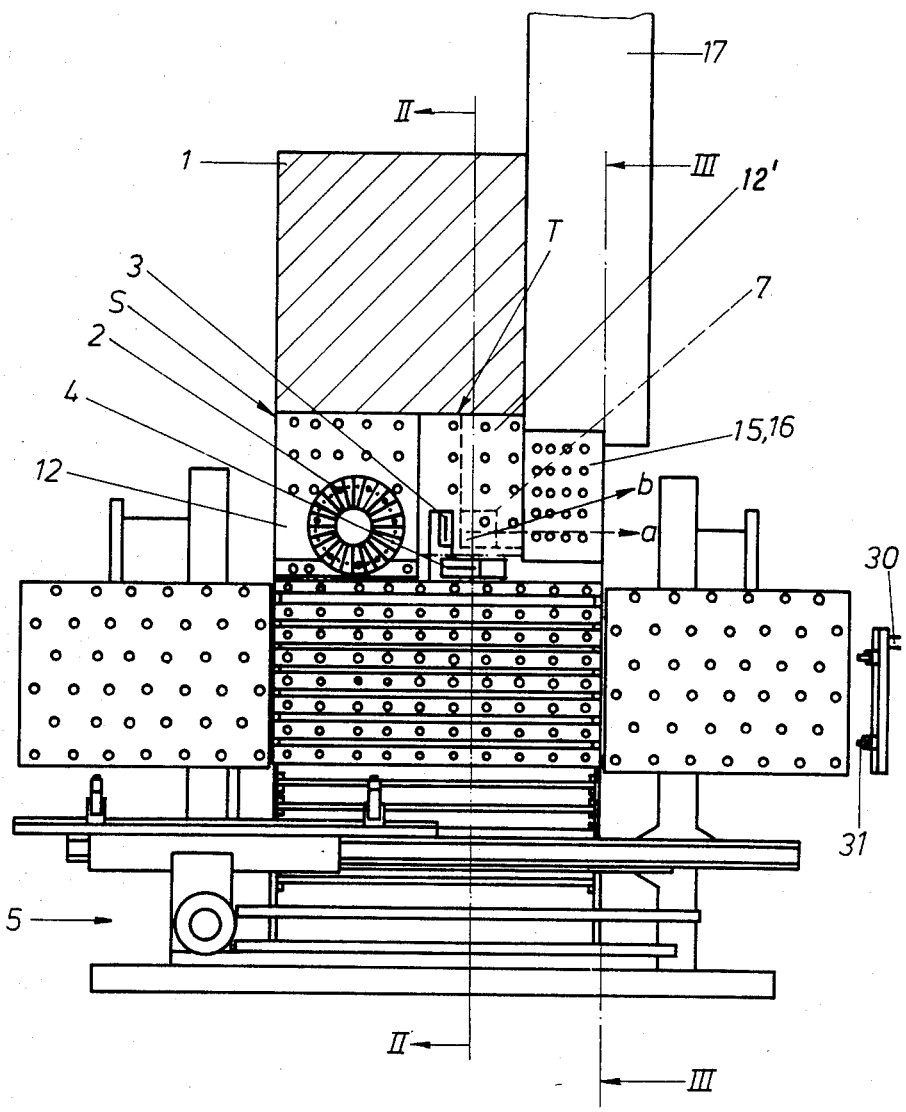
FIG. 1 is a partially sectioned diagrammatic top plan view of a cutting press which is suitable for use with the removing arrangement of the present invention which, however, is not shown therein since it is situated above the plane of the drawing.

Referring now to the drawing in detail, it is to be mentioned first that it is rather diagrammatic at least as far as the structure in which the arrangement of the present invention is being used, that is, a cutting press equipped with a coordinate table, is concerned. On the other hand, the drawing depicts the arrangement of the present invention in sufficient detail to be able to understand the contribution to the art as presented by the invention.

FIG. 1 shows a cutting and pressing machine, hereafter referred-to as a cutting press for the sake of brevity, which is equipped with a numerically controlled or NC coordinate table. The cutting press has a cutting region at which cutting or other tools are arranged, this cutting region being constructed like an indexible turret cutting press. The cutting press includes a machine base or frame 1, on which there are mounted a cutting device S, on the one hand, and a severing device T, on the other hand. The cutting device S includes at least one cutting tool and is illustrated in FIG. 1 as including an indexible turret or disk 2. The severing device T is provided with severing or separating tools 3 and 4. In a manner which is per se known, a coordinate table, here indicated at 5, is arranged in front of the cutting and severing devices S, T. The coordinate table 5 is equipped with displacing devices which can be operated to displace the coordinate table 5 in mutually normal directions which are indicated in FIG. 1 by arrows X and Y, to thereby move a respective workpiece which is connected to the coordinate table 5 for joint displacement therewith in the desired manner with respect to the cutting and severing devices S and T. As also illustrated in FIG. 1, the severing blades or tools 3 and 4 of the severing device T are arranged correspondingly to these displacement directions X and Y and thus to the workpiece movement directions.

In the part of the machine frame 1 which is associated with the severing tools or knives 3 and 4 of the severing device T, and at a zone of this structural part which is outside the range of movement of the severing tools 3 and 4 of the severing device T and which is indicated by broken lines in FIG. 1 and identified by the reference numeral 7, there is arranged an entraining arrangement of the present invention which, however, is not shown in FIG. 1 since it is situated upwardly of the plane in which the view is taken; however, this entraining arrangement will be discussed in detail later in conjunction with other Figures of the drawing which show the construction thereof.

Still referring to FIG. 1 of the drawing, it may be seen that the zone 7 at which the entraining arrangement is situated is disposed upwardly of a support table 12 which is arranged at the same elevation and along the same plane as support surfaces 12' of the cutting press and especially of the cutting device S and of the coordinate table 5. The entraining arrangement is movable toward and away from the top surface of the respective workpiece then located underneath the zone 7 and is operative for transporting such workpiece from the region of the severing tools 3 and 4 of the severing device T to a following conveying arrangement which is identified in FIG. 1 by the reference numerals 16 and 17 and which will be discussed in more detail later.

Figure 2:
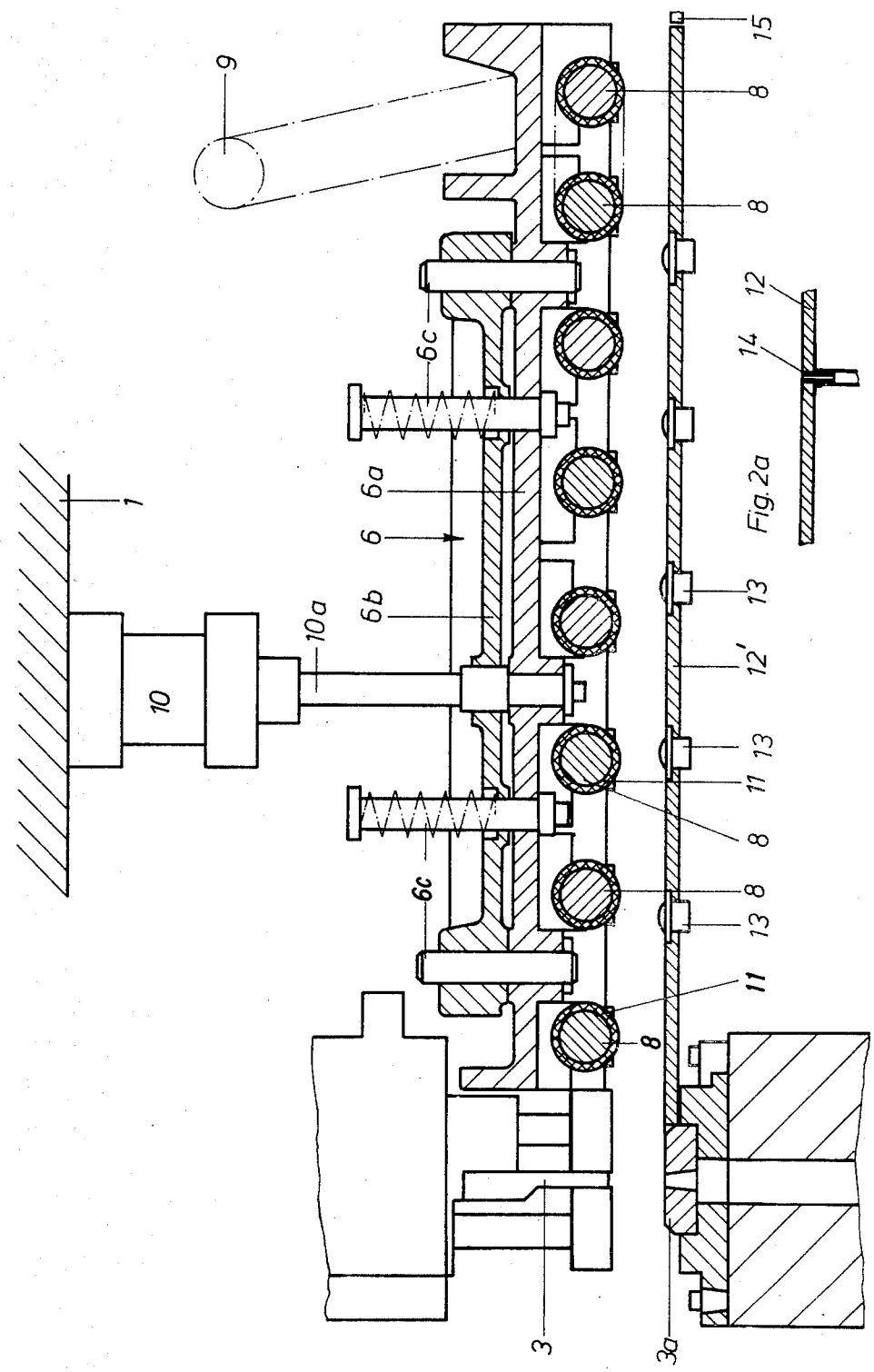
FIG. 2 is an enlarged cross-sectioned partial side elevational view of that region of the cutting press of FIG. 1 where the entraining and removing arrangement of the present invention is situated, taken on line II—II of FIG. 1.
Figure 3:
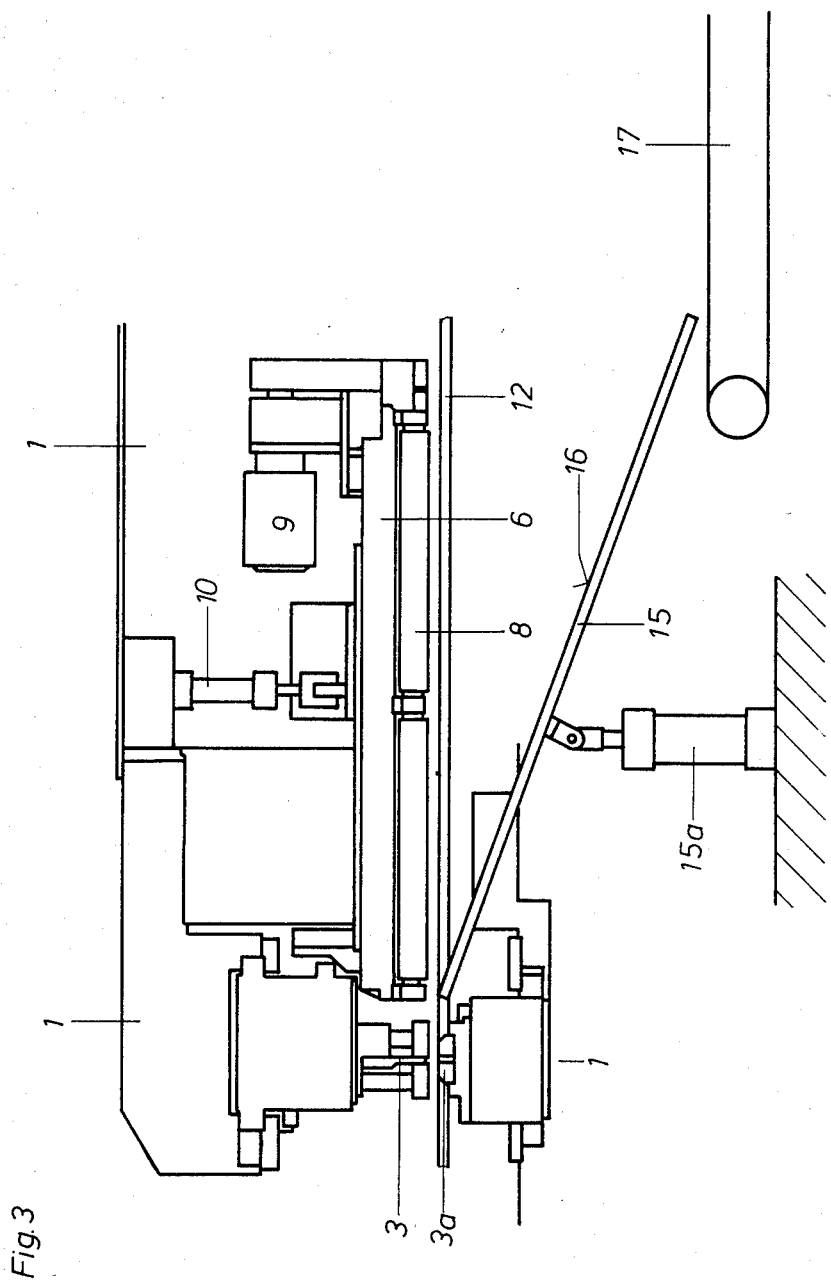
FIG. 3 is a sectional view of the cutting press of FIG. 1 equipped with the removing arrangement of FIG. 2 taken along the line III—III of FIG. 1.

FIGS. 2 and 3 illustrate a first construction of the cutting press as equipped with a first embodiment of the entraining arrangement of the present invention, with a particular construction of the support table 12, and with the following conveying arrangement 16 and 17.

The entraining arrangement of FIGS. 2 and 3 is generally identified by the reference numeral 6. The entraining arrangement 6 is constructed as a flat carrier which may be lowered and raised and which includes a lower carrier plate 6a and an upper guiding plate 6b, the plates 6a and 6b being movable together and apart by means of guiding and moving means 6c. At the lower side of the carrier plate 6 which faces the workpiece, which has not been shown in the drawing, or the support table 12 for this workpiece, there is arranged a plurality of entraining rollers 8 which are mounted for rotation about mutually parallel axes and which are driven to rotate about their axes. The carrier 6 is disposed at the free movement zone 7 behind the severing tools 3 and 4, as shown in FIG. 1. Of these severing tools 3 and 4, only the severing tool 3 for the Y-direction is shown in FIGS. 2 and 3 as carried by the machine frame 1. There is also shown a severing die 3a which cooperates with the severing tool or knife 3. It may be seen that the axes of the entraining rollers 8 extend not only parallel to one another, but also in the Y-direction of the coordinate table 5, as well as in parallelism with the plane of the support table 12. All of the entrailing rollers 8 are driven in common by means of a motor 9, as indicated in FIG. 2 by dash-dotted lines.

The carrier 6 which is equipped with the entraining rollers 8 can be lowered toward the respective workpiece or toward the support table 12. To achieve this purpose, there is arranged on the diagrammatically illustrated machine frame 1 a vertically acting driving arrangement 10, advantageously a hydraulically or pneumatically operated cylinder-and-piston unit having a piston rod 10a on which there are mounted the lower carrier plate 6a and the guiding plate 6b of the carrier 6, as shown in FIG. 2.

The entraining rollers 8 are advantageously provided with a friction coating in the form of a suitable jacket 11. The jacket 11 is advantageously made of synthetic plastic material, rubber, or similar friction-enhancing material. The outer surface of the jacket 11 may be smooth or, in order to further enhance the entraining effect thereof, it may be provided with surface texture, such as with corrugations or flutes.

In order to keep the friction between the support table 12 and the workpiece during the transportation of the latter to a minimum, the support table 12 is provided with a plurality of rolling bodies 13 for the workpiece, which may be configured as rollers or balls and which are distributed over the upper surface 12' of the support table 12. A further enhancement of the entraining contact between the entraining rollers 8 and the respective workpiece can be achieved by providing the support table 12 with a plurality of air nozzles 14 which are distributed over the area or surface 12' of the support table 12 and which are directed against the workpiece then supported on the latter, as shown by way of an example in FIG. 2a.

The mode of operation of the above-discussed entraining arrangement is as follows: When the machining or working of the workpiece on the severing device T is completed, the carrier 6 is lowered by the driving arrangement 10 until the entraining rollers 8 engage the upper surface of the respective workpiece. The entraining rollers 8 are driven in such a manner that they, after contacting the workpiece which usually is constituted by a section of sheet metal, advance or transport the workpiece in the X-direction as seen in FIG. 1, out of the operating range of the cutting press. The lowering of the carrier 6 is initiated in response to a command signal issued by a numeric control device which controls the operation of the cutting press, this command being executed by the driving unit 10. The tranportation of the workpiece takes place in the direction of an arrow a of FIG. 1 in this instance.

As may be seen from a comparison of FIGS. 1 and 3 with one another, there is further provided, in continuation of the support table 12 next to the machine body or frame 1, an inclined descent surface 16 which is constituted by a plate 15. A further conveying arrangement, such as a conveyor belt 17, is arranged at the lower end of the descent surface 16. Consequently, the respective workpiece which is engaged and transported by the entraining rollers 8 advances toward and onto the descent plate 15 or the descent surface 16, so that it can slide down on the thus formed slide either into a collecting receptacle which may be arranged at the lower end of the descent surface 16, or onto the above-described belt conveyor 17 which then transports the same to a collecting receptacle or to a stacking arrangement. The inclination of the descent plate 15 and thus the inclination of the descent surface 16 can be adjusted by a driving arrangement 15a which is illustrated in FIG. 3. It is also possible to let the descent plate 15 extend in the plane of the support table 12 at first, and to lower the same by means of the driving arrangement 15a substantially into the illustrated position thereof only after the respective workpiece has been transferred thereonto.

Another construction of the entraining arrangement in accordance with the present invention is illustrated in FIGS. 4 and 5. Even this entraining arrangement is situated, as indicated in FIG. 5 by the diagrammatically illustrated severing tools 3 and 4, at the movement zone 7 of FIG. 1 upwardly of the support table 12. In this embodiment of the present invention, the entraining arrangement includes an elongated entraining member 18 which is situated upwardly of the respective workpiece to be entrained or transported, that is, upwardly of the support table 12. As illustrated, the entraining member 18 includes a rail-shaped main portion which is provided at its lower end with a frictional coating or arrangement 21. The frictional arrangement 21 may include ribs or pin-shaped projections or elements or the like, and is made of high-friction material, such as rubber, synthetic plastic material or the like. The entraining member 18 with its frictional arrangement 21 acts, in a manner still to be described, as a wiper or sweeper for the workpiece to be transported. This entraining member 18 is mounted on an adjusting member, such as a holder, 20 which is movable by a drive in and opposite to the desired advancement direction of the workpiece to be transported. This holder 20 is mounted on two guiding rods 19 which extend parallel to the advancement direction and are mounted on a rocking member 23. A driving arrangement 22, illustrated in the drawing as a pneumatically operatable cylinder-and-piston unit having a piston rod 22a, is operative for moving the holder 20 in the longitudinal direction of the rods 19. The rocking member 23 is mounted on the machine body or frame 1 which is only diagrammatically indicated in FIG. 4 for pivoting about an axle 24 which extends parallel to the plane of the support table 12 and normal to the desired advancement direction of the workpiece during its transportation out of the cutting press. Another driving arrangement 25 is provided for pivoting the rocking member 19, the driving arrangement 25 being mounted on the machine body or frame 1 and being preferably constructed as a pneumatically or hydraulically operatable cylinder-and-piston unit as well.

Having so described the construction of the entraining arrangement of FIGS. 4 and 5, the operation thereof in the cutting press of FIG. 1 will now be briefly explained. After the respective workpiece has been completely worked or machined in the cutting press and particularly in the severing device T thereof, the holder 20 is moved, together with the entraining member 18 that is mounted thereon, out of its rest position which is illustrated in FIG. 4 in dash-dotted lines and indicated by the reference numeral 26 into its working position illustrated in FIGS. 4 and 5 in bold lines, as a result of an energization of the driving arrangement 22 in one direction. This moves the entraining member 18 and its frictional portion 21 to a position immediately adjacent to a stripper 27 of the severing tool 3 which extends in the Y-direction, in which working position the frictional portion 21 is ready to contact the appropriate region of the upper surface of the workpiece then supported on the support table 12. Once the entraining member 18 with its frictional portion 21 has reached this forward or working position, which is indicated in FIG. 4 by the reference numeral 28, it is lowered toward the upper surface of the respective workpiece, due to swinging motion of the rocking member 19 which is caused by the operation of the driving arrangement 25, until the frictional portion 21 engages and presses against the upper surface of the workpiece. Thereafter, this pressing action between the entraining member 18 with its frictional portion 21 and the workpiece to be transported is maintained and the driving arrangement 22 is energized in the opposite or rearward direction, so that the piston rod 22a causes the holder 20, and with it the entraining member 18, to move above the support table 12 in direction toward the side of the machine, until the workpiece or final product is transported beyond an edge 29 of the support table 12. As diagrammatically shown in FIGS. 4 and 5, the descent plate 15 with the descent surface 16 is again arranged at the edge 29, so that the workpiece descends onto the descent surface 16 to slide down the same and to be transported in the manner previously discussed. The direction of movement of the entraining arrangement of this construction is indicated in FIG. 1 by the reference character b, this direction b enclosing an angle differing from the right angle with respect to the displacement directions X and Y of the coordinate table 5 or with respect to the cutting edges of the severing tools 3 and 4 and their movement directions.

The respective components or portions of the machine body or frame 1 are shown in the drawing only diagrammatically and as to their principles. The respective bearing and holding means on this machine body or frame 1 for the respective parts mounted thereon are constructed in the respectively appropriate manner in accordance with well known structural principles, so that the machine body 1 may have any desired configuration and distribution of the components thereof.

For structural reasons, the width of the following conveying arrangements, such as the illustrated descent plate 15, 16, cannot be made arbitrarily large. When the resulting workpieces or final products have a width which exceeds that which is ordinarily handled by the machine, it is advantageous to provide, in addition to the above-discussed entraining arrangements, a withdrawing arrangement 30 indicated in FIG. 1 which is provided with gripping means 31 for an edge portion of the respective workpiece. The withdrawing arrangement 30 is arranged at that side of the workpiece-supporting surface of the machine which extends in the direction of movement of the workpieces after the completion of the machining or working operations thereon. The gripping means 31, which may be constructed as mechanical grippers but also as suction grippers, are operative for completely withdrawing the finished workpiece or product out of the region of the press, and for transferring such product or workpiece to the respective transporting arrangement or for stacking such workpieces or products on a liftable table or the like. Advantageously, a pneumatically operated drive is provided for the withdrawing arrangement 30 in order to expedite this withdrawing operation. Even this withdrawing arrangement can be operated in an automatic manner, that is, it can be controlled in a synchronized manner with the other operations of the machine, so that even this assures the fully automated operation of the cutting press or of the operating center.

It will be understood that each of the elements described above, or two or more together, may also find a useful application in other types of arrangements differing from the type described above.

While the invention has been illustrated and described as embodied in an arrangement for removing workpieces from a cutting press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An arrangement for removing plateshaped workpieces from a cutting press including a frame, a support table mounted on the frame and having a support surface for the workpieces extending along the plane and operative for advancing the workpieces along the support surface toward machining a severing zones of the support table, and machining and severing devices respectively arranged at the machining and severing zones, comprising means for entraining the respective workpiece at the severing zone outside of the operating range of the severing device and for transporting the entrained workpiece in a predetermined direction away from the severing zone, said entraining means being mounted on the machine frame upwardly of the support surface of the support table for movement toward and away from said plane between a rest position and an entraining position in which it transports the respective workpiece in the predetermined direction while being always completely disposed above said plane, said entraining means including a rocking member mounted on the frame for pivoting about an axis normal to said predetermined direction; means for pivoting said rocking member about said axis; an adjusting member mounted on said rocking member for movement in and opposite to said predetermined direction; means for moving said adjusting member relative to said rocking member mounted on the latter; an elongated entraining member mounted on said adjusting member for movement therewith and extending to above the zone of the support surface which supports the respective workpiece after the termination of the severing operation; and conveyor means arranged along the path of transportation of the workpieces downstream of said entraining means and operative for removing the workpieces out of the range of operation of said entraining means.

2. The arrangement as defined in claim 1, wherein said conveying means includes a descent surface for the respective workpiece extending from the support surface in said predetermined direction.

3. The arrangement as defined in claim 2, wherein said descent surface is downwardly inclined as considered in said predetermined direction.

4. The arrangement as defined in claim 3; and further comprising means for adjusting the angle of inclination of said descent surface.

5. The arrangement as defined in claim 1 for use in a cutting press in which the severing device includes two severing tools movable in the displacement directions of the coordinate table and extending parallel to such directions, wherein the region from which the workpieces are to be removed is disposed at those sides of the severing tools which face in the advancement direction.

6. The arrangement as defined in claim 5, wherein the advancement direction of the workpieces encloses an acute angle differing from right angle relative to the directions of displacement of the coordinate table.

7. An arrangement for removing plate-shaped workpieces from a cutting press including a frame, a support table mounted on the frame and having a support surface for the workpieces extending along the plane and operative for advancing the workpieces along the support surface toward machining a severing zones of the support tables, and machining and severing devices respectively arranged at the machining and severing zones, comprising means for entraining the respective workpiece at the severing zone outside of the operating range of the severing device and for transporting the entrained workpiece in a predetermined direction away from the severing zone, said entraining means being mounted on the machine frame upwardly of the support surface of the support table for movement toward and away from said plane between a rest position and an entraining position in which it transports the respective workpiece in the predetermined direction while being always completely disposed above said plane, said entraining means including a rocking member mounted on the frame for pivoting about an axis normal to said predetermined direction, said rocking member having at least two guiding rods extending in said predetermined direction; means for pivoting said rocking member about said axis; an adjusting member mounted on said rocking member for movement in and opposite to said predetermined direction, said adjusting member being mounted on said guide rods for movement longitudinally thereof; means for moving said adjusting member relative to said rocking member mounted on the latter; an elongated entraining member mounted on said adjusting member for movement therewith and extending to above the zone of the support surface which supports the respective workpiece after the termination of the severing operation; and conveyor means arranged along the path of transportation of the workpieces downstream of said entraining means and operative for removing workpieces out of the range of operation of said entraining means.

8. An arrangement for removing plate-shaped workpieces from a cutting press including a frame, a support table mounted on the frame and having a support surface for the workpieces extending along the plane and operative for advancing the workpieces along the support surface toward machining a severing zones of the support table, and machining and severing devices respectively arranged at the machining and severing zones, comprising means for entraining the respective workpiece at the severing zone outside of the operating range of the severing device and for transporting the entrained workpiece in a predetermined direction away from the severing zone, said entraining means being mounted on the machine frame upwardly of the support surface of the support table for movement toward and away from said plane between a rest position and an entraining position in which it transports the respective workpiece in the predetermined direction while being always completely disposed above said plane; means for withdrawing the respective workpiece from the range of operation of said entraining means, including gripping means for a portion of the respective workpiece; and conveyor means arranged along the path of transportation of the workpieces downstream of said entraining means and operative for removing the workpieces out of the range of operation of said entraining means.

* * * * *